Patented Sept. 25, 1928.

1,685,734

UNITED STATES PATENT OFFICE.

GEORG FRIEDRICH UHDE, OF BOVINGHAUSEN, GERMANY.

METHOD FOR SYNTHETICALLY PRODUCING AMMONIA.

No Drawing. Application filed May 28, 1926, Serial No. 112,409, and in Germany June 4, 1925.

This invention relates to processes of synthetically producing ammonia and it comprises a process in which the usual gases used in the synthesis of ammonia are passed over a catalyst comprising the reaction product of a complex alkali metal iron cyanide compound and a hydrolizable metal salt such as aluminum chloride.

The use of complex iron cyanide compounds for instance, ferro-ferri-cyanide, otherwise known as Turnbull's blue or ferri-ferro-cyanide, usually spoken of as Berlin blue has been suggested in the synthesis of ammonia. These complex iron compounds contain iron both as part of a complex radical and in an ionizable or so-called "extra-radical" condition. In use, these complex iron cyanides above referred to are not very satisfactory. Only small yields of ammonia are obtained through their use. The reason for this is most probably because these iron compounds are difficultly dried. In fact it is impossible to completely dry these iron compounds for the reason that at the high drying temperature necessary almost complete dissociation of the molecules takes place before all of the water is removed. Therefore it has been necessary to use these catalysts in a wet condition and it is well known that water exerts a detrimental effect on the catalytic activity of the complex iron compounds above mentioned.

I have discovered that it is possible to build up complex iron cyanide compounds which may be completely dried without dissociation and hence ruination of the catalyst taking place. In the compounds which I have prepared and which I shall describe, I have found it possible to remove the water from them completely at temperatures below the temperature of dissociation of the compounds. As stated it is impossible to completely remove the water from ferro-ferri-cyanide or ferri-ferro-cyanide without some dissociation taking place.

Since I can completely dry my new catalyst without experiencing any dissociation, it will be apparent that the disturbing influence of water in the synthesis of ammonia with iron compounds is completely obviated.

According to my invention, I substitute for the ionizable or "extra-radical" iron in ferro-ferri-cyanide for instance, a metal such as aluminum which so changes the complex iron molecule that it is possible to dry the material at temperatures below the dissociation temperature completely.

I find it particularly advantageous to prepare my new catalyst by reacting easily hydrolized metal salts with a complex alkali metal iron cyanide compound such as potassium ferro-cyanide or potassium ferri-cyanide. In carrying out my process, I make up a solution of potassium ferro-cyanide or ferri-cyanide in water and add the solution so prepared to a dilute hot solution of aluminum chloride. The resulting solution is then heated. As a result of the heating, the aluminum chloride of course, hydrolizes to liberate free hydrochloric acid. The hydrochloric acid converts the potassium ferro- or ferri-cyanide into a complex iron cyanide compound somewhat like Berlin blue or ferri-ferro-cyanide which, of course, contains ionizable iron. The aluminum hydroxide liberated as one of the hydrolysis products reacts with the complex iron cyanide compound formed to give a complex iron cyanide, in which the ionizable iron is replaced by aluminum. The whole solution, after the formation of the complex aluminum iron cyanide compound is thereafter evaporated to dryness with stirring and the resulting material may be used as the catalyst. Customarily I employ equivalent molecule quantities of aluminum chloride and potassium ferro- or ferri-cyanide although an excess of 50% of the potassium compound may be used.

The hydrolizable metal salt reacted with the complex alkali metal iron cyanide must be of such a nature that the resulting complex iron cyanide compound can be dried completely to free it from water without dissociation.

I claim:

1. In the process of synthetically producing ammonia, the step which comprises contacting the ammonia forming gases with a catalyst comprising the dried reaction product of a complex alkali metal iron cyanide compound with a hydrolizable metal salt.

2. In the process of synthetically producing ammonia, the step which comprises contacting the ammonia forming gases with a catalyst comprising the dried reaction product of a complex alkali metal iron cyanide compound and aluminum chloride.

3. In the process of synthetically producing ammonia, the step which comprises contacting the ammonia forming gases with a catalyst comprising the dried reaction product of a complex potassium iron cyanide compound with aluminum chloride.

GEORG FRIEDRICH UHDE.